(12) United States Patent
Thunemann et al.

(10) Patent No.: US 9,600,243 B2
(45) Date of Patent: *Mar. 21, 2017

(54) SHARING OF FIRST CLASS OBJECTS ACROSS MULTIPLE INTERPRETED PROGRAMMING LANGUAGES

(71) Applicant: The Boeing Company, Chicago, IL (US)

(72) Inventors: Paul Z. Thunemann, Snoqualmie, WA (US); Stephen L. Ray, Algona, WA (US)

(73) Assignee: The Boeing Company, Chicago, IL (US)

( * ) Notice: Subject to any disclaimer, the term of this patent is extended or adjusted under 35 U.S.C. 154(b) by 415 days.

This patent is subject to a terminal disclaimer.

(21) Appl. No.: 14/258,975

(22) Filed: Apr. 22, 2014

(65) Prior Publication Data

US 2014/0317642 A1 Oct. 23, 2014

Related U.S. Application Data

(63) Continuation of application No. 13/279,748, filed on Oct. 24, 2011, now Pat. No. 8,782,673.

(51) Int. Cl.
  *G06F 9/44* (2006.01)
  *G06F 9/445* (2006.01)
  *G06F 9/54* (2006.01)

(52) U.S. Cl.
  CPC ............ *G06F 8/31* (2013.01); *G06F 9/44521* (2013.01); *G06F 9/541* (2013.01)

(58) Field of Classification Search
  CPC .... G06F 9/45516; G06F 9/45508; G06F 8/30; G06F 8/36; G06F 9/443

(Continued)

(56) References Cited

U.S. PATENT DOCUMENTS 6,253,772 B1   7/2001  Chambers et al.
6,256,772 B1 *  7/2001  Apte .......................... G06F 8/00
                                                            717/100

(Continued)

FOREIGN PATENT DOCUMENTS

CN           1073276         6/1993

OTHER PUBLICATIONS

Erich Gamm, et al., Design Patterns: Elements of Reusable Object-Oriented Software, pp. 139-150.

(Continued)

*Primary Examiner* — Hang Pan
*Assistant Examiner* — Hui-Wen Lin
(74) *Attorney, Agent, or Firm* — Kunzler Law Group, PC

(57) ABSTRACT

Systems and methods are disclosed for enabling users to write scripting code in a first scripting language, and then use a second scripting language to call language constructs written in that first scripting language. Functions, Class Definitions, Class Instances, Modules and other language constructs are treated as first-class objects that can be shared across the different scripting languages. The techniques disclosed herein are also applicable to domain-specific languages. As part of the methodology, a respective underlying representation of each of these object types is designed as an interface and then that interface is implemented in each scripting language. In addition, code is written in each scripting language implementation to allow the latter to use the interface to represent a Function, Class, or other language construct.

14 Claims, 2 Drawing Sheets

(58) Field of Classification Search
USPC .......................................................... 717/115
See application file for complete search history.

(56) References Cited

U.S. PATENT DOCUMENTS

| | | | | |
|---|---|---|---|---|
| 2001/0037417 | A1* | 11/2001 | Meyer ....................... | G06F 8/76 |
| | | | | 719/332 |
| 2002/0178141 | A1* | 11/2002 | Kushnirskiy ........... | G06F 9/465 |
| 2003/0126311 | A1* | 7/2003 | Kushnirskiy ........... | G06F 9/443 |
| | | | | 719/328 |
| 2003/0149801 | A1* | 8/2003 | Kushnirskiy ............. | G06F 9/44 |
| | | | | 719/328 |
| 2012/0303704 | A1* | 11/2012 | Schleifer ................. | G06F 9/541 |
| | | | | 709/204 |

OTHER PUBLICATIONS

Communication pursuant to Article 94(3) EPC concerning EP Application No. 12189820.9 dated Jul. 5, 2016.
Office Action for Canadian Patent Application No. 2,792,552 dated Aug. 5, 2016.
Office Action for Chinese Patent Application No. 201210406297.2 dated Sep. 26, 2016.
First Notification and Search Report for Chinese Patent Application No. 201210406297.2 dated Sep. 26, 2016.

* cited by examiner

SHARING OF FIRST CLASS OBJECTS ACROSS MULTIPLE INTERPRETED PROGRAMMING LANGUAGES

CROSS-REFERENCE TO RELATED APPLICATION

This application is a continuation of U.S. patent application Ser. No. 13/279,748, filed on Oct. 24, 2011, which is incorporated herein by reference.

BACKGROUND

The present disclosure relates generally to interfaces which allow the use in one interpreted programming language of language constructs written in a different interpreted programming language. In particular, this disclosure relates to interfaces which would allow a user of a high-level script to integrate lower-level scripts written in different scripting languages.

Compiled languages cannot be used interactively. The standard use case is to write the code, compile the code, and then run the code. This is a good paradigm for a software developer who is writing an application, but it is not as useful for an engineer or mathematician who needs to explore and solve a problem.

Interpreted languages can be used interactively. An engineer can have a "prompt" where he/she types code and the code is interpreted and then executed while the underlying application is running. Examples of interpreted languages include Python, Ruby, etc.

Scripting languages are added to applications to allow a user to drive the application from a command prompt or text file. Interpreted languages can be used as scripting languages and hereinafter this disclosure will refer to interpreted languages that are used for scripting as "scripting languages".

Python is an interpreted language. It has several implementations, including CPython and Jython. CPython is written in C language and is commonly called Python. Jython is written in Java.

Java is a compiled language that runs on a Virtual Machine. There are several scripting languages that are built on top of the Java Virtual Machine. These are commonly referred to as J-Based scripting languages. (Examples include Jython, JRuby, Groovy and Rhino.)

A proprietary J-based scripting language is known that is a domain-specific language designed for geometry manipulation and meshing (creating discrete representations). Also known is an application written in Java for geometric construction, analysis and manipulation, which is designed to be scripted. The underlying Java code defines many geometry operations. Engineers can then use these scripts to make use of specific geometry operations to solve their engineering problem. These scripts represent knowledge capture of the engineering process. There is a strong need to reuse these scripts. There is a need to be able to drive the aforementioned geometric construction application using these preexisting proprietary language scripts.

Consider a high-level engineering process that consists of several lower-level engineering processes. Each lower-level process may have already been written. An engineer needs to be able to write a high-level script that integrates the lower-level scripts. Since these scripts may be written in more than one scripting language, a way is needed to easily share the functions, classes, instances and objects that were created in the different scripting languages.

It is currently possible in existing scripting environments to share data between scripting languages, but to do so takes programming skill as well as knowledge of the underlying Java language. A solution to this problem should be designed for engineers, not for application developers, so the solution should not require additional programming/software development on the engineer's part.

Thus there is a need for a methodology that allows different engineers to program in different scripting languages and then share the code they write across these scripting languages without considering issues of the underlying language implementations. Preferably the solution will also include domain-specific languages.

SUMMARY

Systems and methods are disclosed for enabling users to write scripting code in a first Java-based scripting language, such as Jython, JRuby, and Matlab, and then use a second Java-based scripting language to call language constructs written in that first scripting language. Language constructs include, for example, Lists, Sets, Maps, Functions, Class Definitions, Class Instances and Modules of code. For example, the disclosed methodology enables an engineer to write a function in one scripting language and call it from another scripting language. The techniques disclosed herein are also applicable to domain-specific languages.

In accordance with the embodiments disclosed hereinafter, Functions, Class Definitions, Class Instances, Modules and other language constructs are treated as first-class objects that can be shared across the different scripting languages. In computing, a first-class object is an entity that can be constructed at run-time, passed as a parameter or argument, returned from a subroutine, or assigned into a variable. As part of the methodology disclosed herein, a respective underlying representation of each of these object types is designed as a Java interface and then that interface is implemented in each scripting language. In addition, code is written in each scripting language implementation to allow the latter to use the Java interface to represent a Function, Class, or other language construct.

The methodology disclosed herein allows different scripting languages to interact with each other in a way that is natural for the given language so that the engineer using that scripting language need not consider or have any expertise in or knowledge of other scripting languages when they write their scripts.

More specifically, one aspect of the invention is a method of sharing language constructs among different scripting languages comprising: (a) defining a core application programming interface which is language-neutral relative to a plurality of scripting languages, the core application programming interface comprising a respective core interface for each of a plurality of types of language constructs; (b) calling a language construct of a type written in a first scripting language, the call being made by a language construct of the type written in a second scripting language; (c) creating an instance of a core interface that handles language constructs of the type; (d) redirecting the call to the instance of the core interface; and (e) redirecting the call received by the instance of the core interface to the language construct of the type written in the first scripting language.

Another aspect of the invention is a system that enables language constructs to be shared among different scripting languages, the system comprising a core application programming interface which is language-neutral relative to a plurality of scripting languages, the core application programming interface comprising a respective core interface for each of a plurality of types of language constructs, and a processor programmed to execute operations (b) through (e) set forth in the preceding paragraph in response to a user command.

A further aspect of the invention is a method of making a call to a language construct, wherein the call is written in a first scripting language while the language construct is written in a second scripting language, comprising: (a) defining a core application programming interface which is language-neutral relative to the first and second scripting languages, the core application programming interface comprising a respective core interface for each of a plurality of types of language constructs; (b) creating first and second core interface objects; (c) creating a first language adapter object that redirects the call to the first core interface object; (d) creating a language construct object written in the second scripting language; (e) creating a first core adapter object that redirects the call received by the first core interface object to the language construct object; (f) creating a second language adapter object that returns to the second core interface object a result produced by the language construct object; and (g) creating a second core adapter object that redirects the returned results received by the second core interface object to a language construct object written in the first scripting language.

Yet another aspect of the invention is a system for making a call to a language construct, wherein the call is written in a first scripting language while the language construct is written in a second scripting language, the system comprising a core application programming interface which is language-neutral relative to the first and second scripting languages, the core application programming interface comprising a respective core interface for each of a plurality of types of language constructs, and a processor programmed to execute operations (b) through (g) set forth in the preceding paragraph in response to a user command.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
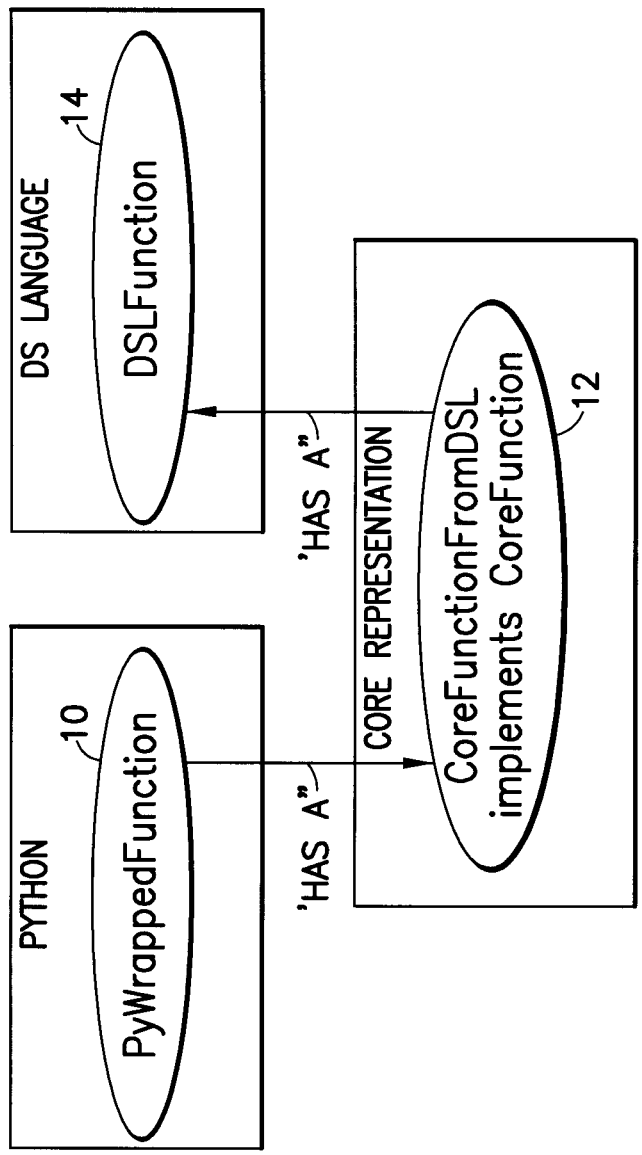
FIG. 1 is a diagram showing an adapter pattern for use when a Python user calls a function (named DSLFunction) written in a domain-specific language by means of a Core API.

In the detailed disclosure that follows, the terms interface, Class definition, Class Instance, application programming interface and adapter will have the following meanings:

Interface: A set of related methods (just the signatures of the methods, not the implementations).

Class Definition: A set of methods implemented together. A class definition may implement one or more interfaces. The implementation often defines some data that is encapsulated and acted on by the implemented methods.

Class Instance: A class definition can be instantiated multiple times. Each instantiation of the class definition is called a class instance.

Application Programming Interface (API): A set of interfaces and class definitions with a set of behaviors associated with those interfaces and those classes.

Adapter: A design pattern that allows an existing API to use an existing class definition that is not part of the API. This is commonly done when the class definition it notionally the same as some interface or class that is in the API. The adapter is a new class definition that conforms to the existing API. The existing class definition (which is not in the API) is called the adaptee. The adapter contains the adaptee and implements an interface in the existing API (or extends a class in the existing API) by making use of the adaptee.

To understand the methodology disclosed hereinafter, it is useful to look at how two scripts interact with each other when they are written in the same language. First consider a simple script written in the Python language that defines a function which adds two numbers and returns the result. Then consider a second script that uses the first script to perform the addition operation.

Here is the code for the first script; it is written in a file called pyExample.py:

```
---------------start example.py---------------
def add(a, b):
    return a + b
---------------end example.py---------------
```

And here is the code of a second script that uses the first script:

```
--------------start useExample.py---------------
from example import add
print '3 + 4 = ', add(3, 4)
--------------end useExample.py---------------
```

The result of running this script is that it will print: 3+4=7.

This disclosure adopts the Python idiom and will hereinafter refer to each script written in its own file as a "module". Python's import statement allows one module to access a function written in another module. So, in this case, the useExample.py module imports the example.py module, and gets the function called "add" from that module. It then makes use of that function by adding the numbers 3 and 4. Note that the import statement is searching for "add" which is in "example" and to do that, it searches the directories in the Python path for files that have the name "example.py" (and .pyo, .pyc, etc.), it runs "example.py", which results in the creation of a module object, and then it looks in the module for something called "add".

It would be desirable to introduce additional functionality to the Jython language that will allow a user to replace the example.py file with some other file written in a different scripting language. Here is an example of a file written in a domain-specific language:

```
--------------start example.DSL--------------
function add(a as double, b as double)
    return a + b end function
--------------end example.DSL--------------
```

The goal is to be able to put example.DSL in the Python path instead of example.py and then have the module useExample.py script work without modification. The methodology disclosed hereinafter allows that to happen.

Here is a list of language constructs that are typical across most procedural languages:

Data Types: Primitives (including int, double, char, short, float, byte, and language specific constructs), Strings, Lists, Dictionaries (sometimes called maps), Sets (commonly implemented as the keys of a dictionary, only available in some languages), Tuples (a fixed list, only some languages), and Arrays.

Language Types: Functions, Class Definitions, Class Instances, Methods (i.e., methods of a class instance), and Modules.

The methodology disclosed herein enables a user to share each of these types of constructs across different languages. To do this, first define an API (written in Java) which is language-neutral relative to each of a plurality of scripting languages. This API consists of one interface for each Data Type and each Language Type (i.e., for each type of language construct). These language construct interfaces will be referred to herein as the Core interfaces and they will be named such that word "Core" is prepended to the type (e.g., CorePrimitive, CoreString, CoreFunction, CoreClassDefinition, etc.). In addition, all of the interfaces making up the Core will inherit from a common interface called CoreObject.

An exemplary interface for CoreFunction is the following:

```
/**
 * An interface to generically represent a function.
 */
public interface CoreFunction extends CoreObject {
    /**
     * Call the function.
     */
    CoreObject exec( CoreObject... args);
    //....
```

The methodology disclosed herein makes extensive use of the adapter pattern to implement and use the Core interfaces. For each language, two adapters need to be implemented for each type of language construct.

Consider a situation where a call is made by a computer user to the Core that relates to a specific type of language construct and a specific scripting language. The computer programming will have available an implementation of that language construct type in the API of that specific scripting language and will have an interface for that type in the Core API. The first of the two adapters wraps the implementation of the language construct type in the specific scripting language so that the first adapter conforms to the Core API and utilizes the language implementation. The second adapter does the opposite and wraps the Core interface of that language construct type so that it conforms to the API of the specific scripting language but utilizes the instance of the Core interface.

More specifically, for each type of language construct, one takes an existing language class definition and the corresponding existing Core interface and then writes a new class definition that implements that Core interface (hereinafter called a Core Adapter) and the other adapter allows the Core interface for that language construct type to be used within the API of the language implementation (hereinafter called a Language Adapter).

For example, consider the Jython language and consider the Function type. The API for the implementation of the Jython language implementation has a class definition called PyFunction. A user would need to write a Core Adapter that implements the CoreFunction interface and redirects method calls made upon it to method calls in PyFunction. The user also needs to write a Language Adapter that emulates a Python Function and redirects all calls to the CoreFunction that is being wrapped.

FIG. 1 shows an adapter pattern for use when a Python user calls a function 14 (named DSLFunction) written in a domain-specific language. The Python interpreter determines that a call should be made. It executes the call in PyWrappedFunction 10, which is a Language Adapter, and redirects the call to the CoreFunction interface 12, which in this case happens to be a CoreFunctionFromDSL implementation. This CoreFunctionFromDSL implementation 12 is a Core Adapter that redirects the call to the DSLFunction. DSLFunction is part of the domain-specific language implementation and knows how to internally resolve the method.

For example, here is how a DSL function is defined in a text file:

```
function add(a as double, b as double)
    return a + b end function
```

The DSL interpreter will interpret that text and create a DSL function instance. The DSL function can normally be called from the DSL language like this:

```
c = add(1.0, 2.0)
```

The DSL interpreter will interpret the above text by looking up the existing DSL Function instance called "add". It will pass into that DSL Function instance, two inputs (1.0 and 2.0). The DSL Function instance knows internally how to "resolve the function". It will execute the "a+b", which in this case is "1.0+2.0" and it will return the output, 3.0.

So when this same function is called from Python, the system converts from Py objects to Core objects and then from Core objects to DSL objects and then calls the "real" function, which knows how to take those inputs and execute the code that was used to define the function.

An exemplary Language Adapter for converting a Python function to a Core function may take the following form:

```
public class PyWrappedFunction extends PyObject {
    CoreFunction function;
    public PyWrappedFunction( CoreFunction fcn ) {
        function = fcn;
    }
    @Override
    public PyObject_call_( PyObject args[ ], String keywords[ ] ) {
        List <CoreObject> veArgs = new ArrayList <CoreObject>( );
        for ( PyObject arg : args ) {
            CoreObject veArg = JythonAdapterFactory.fromJython( arg );
            veArgs.add( veArg );
        }
        CoreObject result = function.exec( veArgs.toArray( new CoreObject[0] ));
        return JythonAdapterFactory.toJython( result );
    }
```

The Language Adaptor lets a Python function masquerade as a Core function.

An exemplary Core Adapter for converting a Core function to a Python function has the following form:

```
public class CoreFunctionImplementedInPython implements
CoreFunction {
    private PyObject   pycallable;
    @Override
    public CoreObject exec( CoreObject... args ) {
        PyObject[ ] pyargs pyargs = new PyObject[args.length];
        int start = 0;
        for ( int i =start; i < args.length + start; i++) {
            PyObject pyobj =JythonAdaptorFactory.toJython( args[i] );
            pyargs[i] = pyobj;
        }
        /**
         * In practice, there should be additional code that will trap any errors
         * in the user-supplied function and generate a meaningful stacktrace
         * in the error message. (This allows for cross-language tracebacks.)
         */
        PyObject result = pycallable._call_ ( pyargs );
        return JythonAdaptorFactory.fromJython( result )
}
```

The Core Adaptor lets a Core function masquerade as a Python function.

To implement each adapter, the user needs to be able to create adapters for one API based on existing objects from another API. To support this, each scripting language must implement an AdapterFactory class with two methods. One method converts objects for the Core API to the Language API and the other method converts objects from the Language API to the Core API. The factory may create new instances of adapters or may make use of caching so that it can reuse adapters. Note the case where a Python function is wrapped into a Core function and then needs to be converted back into the Python language API. In this case, one does not want to create an adapter, but instead should retrieve the underlying Python function and return it.

Elaborating on the situation depicted in FIG. 1, the DSL function takes DSL objects as input and returns a DSL object as output. The Core function takes Core objects as input and returns a Core object as output. The Python function takes Py objects as input and returns a Py object as output.

For Python to call the DSL function, we need a Python function that adapts a Core function that adapts a DSL function. So the Python function takes Py objects as input. These Py objects are converted into Core objects and the Core function is called with those Core object inputs. This Core function takes the Core object inputs and converts them into DSL object inputs and calls the "real" DSL function. A DSL object is returned as the result. The Core function that is adapting the DSL function converts that returned DSL object into a Core object and returns the Core object. Finally, the Python function takes the returned Core object and converts it into a Python object.

As used herein, "converting" means that the AdapterFactory is called so that the correct adapters can be created or retrieved.

Figure 2:
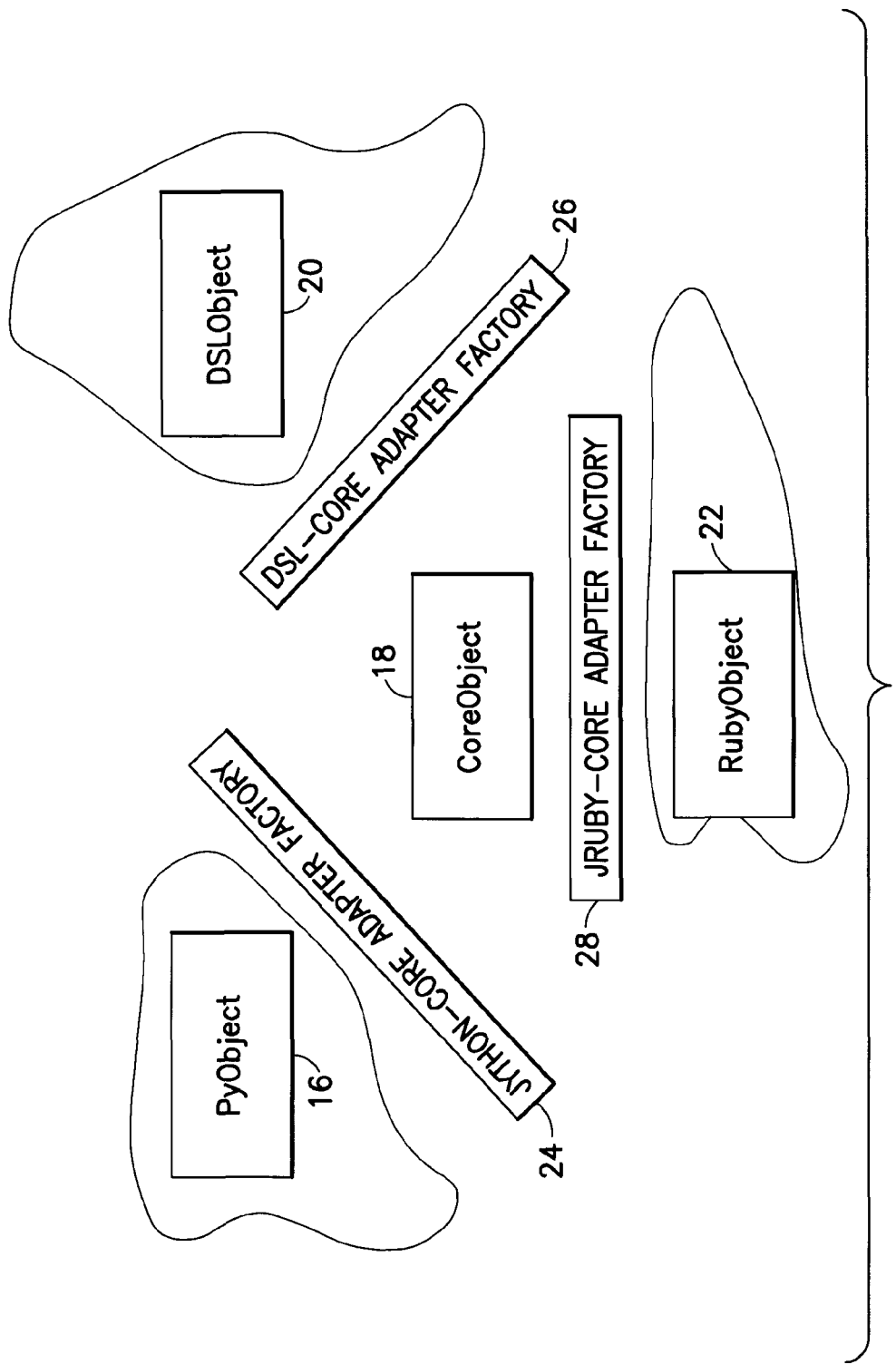
FIG. 2 is a diagram representing object-oriented code for facilitating the sharing of language constructs between a plurality of scripting languages in accordance with one embodiment.

It should be appreciated that the Core interfaces are not limited to those which facilitate the translation of DSL objects into Python objects and the translation of Python objects into DSL objects, as depicted in FIG. 1, but rather can be expanded to include Core interfaces for facilitating the sharing of objects written in other scripting languages. FIG. 2 is a diagram which shows a class CoreObject which can be extended to facilitate the sharing of language constructs written in three different scripting languages: Jython, JRuby and a domain-specific language.

In accordance with the scheme depicted in FIG. 2, the Core API (class CoreObject and extensions) enables a Jython user to access a language construct written in either JRuby or a DSL; enables a JRuby user to access a language construct written in either Jython or a DSL; and enables a DSL user to access a language construct written in either Jython or JRuby.

For example, to enable a Jython user to access a language construct written in a DSL, a first instance of a Jython Language Adaptor (created or retrieved by the Jython-Core AdapterFactory 24) converts a first instance of a PyObject 16 into a first instance of a CoreObject 18; and then a first instance of a DSL-Core Adaptor (created or retrieved by the DSL-Core AdapterFactory 26) converts that first instance of a CoreObject 18 into a first instance of a DSLObject 20. Subsequently, a first instance of a DSL Language Adaptor (created or retrieved by the DSL-Core AdapterFactory 26) converts a second instance of a DSLObject 20 into a second instance of a CoreObject 18; and then a first instance of a Jython-Core Adaptor (created or retrieved by the Jython-Core AdapterFactory 24) converts that second instance of a CoreObject 18 into a second instance of a PyObject 16.

Similarly, to enable a JRuby user to access a language construct written in a DSL, a first instance of a JRuby Language Adaptor (created or retrieved by the JRuby-Core AdapterFactory 28) converts a first instance of a RubyObject 22 into a third instance of a CoreObject 18; and then a second instance of a DSL-Core Adaptor (created or retrieved by the DSL-Core AdapterFactory 26) converts that third instance of a CoreObject 18 into a third instance of a DSLObject 20. Subsequently, a second instance of a DSL Language Adaptor (created or retrieved by the DSL-Core AdapterFactory 26) converts a fourth instance of a DSLObject 20 into a fourth instance of a CoreObject 18; and then a first instance of JRuby-Core Adaptor (created or retrieved by the JRuby-Core AdapterFactory 28) converts that fourth instance of a CoreObject 18 into a second instance of a RubyObject 22.

In a similar manner, a DSL user can import language constructs written in either the Jython or JRuby scripting language; a JRuby user can import language constructs written in the Jython scripting language; and a Jython user can import language constructs written in the JRuby scripting language using the Core API. As previously mentioned, the Core API includes a respective Core interface for each language construct, which Core interfaces inherit from a common interface called CoreObject.

Some languages are case sensitive and other languages are not. Therefore the interfaces for Dictionary and Class Instances do not do lookup by String. Instead, a separate interface is implemented that defines a key called a CoreKey. The embodiment includes implementations of CoreKey that are case sensitive and others that are case insensitive.

To enable the system described above, each language must support the concept of an import hook. The term import hook comes from the Python community and is a mechanism for redefining the function that gets called when an import is performed. The import function needs to be enhanced so that it can handle modules that were written in other languages. The common convention is to use the extension of the filename to determine the language that should be used to interpret the file. Once the file is interpreted, it should produce some Module or Dictionary representation of the contents of the file. That representation can then be used to create a CoreModuleAdapter that can be wrapped into a module.

Note that if import hooks are not supported by the target language, then the general mechanism will still work correctly, but it may require some modification of the calling script so that a function call is made to import the script rather than a more natural import statement.

Also note that some languages cache imported modules so that they do not have to be interpreted again (also, the class definitions do not have to be redefined). When an import occurs in one language, the implementer of the embodiment needs to be careful to cache the imported module into each of the supported languages.

The above-described methodology provides cost savings by allowing engineers to share their analysis codes easily. Different applications written in different languages can be quickly integrated. There is another cost savings when engineers are able to write code in languages with which they are comfortable. They do not need to spend time training in a new language. There is also a cost avoidance. By making it easier to share code, there is a much better chance of getting code reuse.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The method claims set forth hereinafter should not be construed to require that all operations of the method be performed in the order in which they are recited.

The invention claimed is:

1. A method of sharing language constructs among different scripting languages, the method comprising:
   returning a result from a first instance of a first language construct written in a first scripting language in response to a call to the first language construct by a second language construct written in a second scripting language, the call redirected to a first core adapter by way of a first instance of a first core interface and a first instance of a first language adapter;
   redirecting the returned result to a second instance of the first core interface by way of a first instance of a second language adapter configured to convert an object written in the first scripting language into an object written in a language of a core application programming interface;
   redirecting the returned result received by the second instance of the first core interface to the second language construct written in the second scripting language by way of a first instance of a second core adapter configured to convert an object written in the language of the core application programming interface into an object written in the second scripting language, wherein at least the second scripting language supports an import hook configured to import modules written in a different scripting language; and
   caching a module imported in the different scripting language into each of a plurality of supported languages.

2. The method of claim 1, wherein the call comprises a domain-specific language function call made using a core application programming interface.

3. The method of claim 2, wherein the second scripting language comprises a domain-specific language and the first scripting language comprises one or more of a Python, Jython, and a JRuby based language.

4. The method of claim 1, further comprising defining the core application programming interface, wherein the core application programming interface is language neutral relative to a plurality of scripting languages.

5. The method of claim 1, further comprising defining the first and second language adapters and the first and second core adapters for the first and second language constructs.

6. The method of claim 1, further comprising using the first instance of the first language adapter to convert the call written in the second scripting language into a call written in the language of the core application programming interface.

7. The method of claim 6, further comprising using the first instance of the first core adapter to convert the call written in the language of the core application programing interface into a call written in the first scripting language.

8. The method of claim 1, further comprising redirecting the call to the first instance of the first core interface by way of the first instance of the first language adapter.

9. The method of claim 1, further comprising redirecting the call to the first language construct written in the first scripting language by way of the first instance of the first core adapter.

10. An apparatus for sharing language constructs among different scripting languages, the apparatus comprising:
    a language adapter configured to receive a result from a first language construct written in a first scripting language and to convert the result into a language of a core application programming interface, the result provided by the first language construct in response to a call to the first language construct from a second language construct written in a second scripting language, the call redirected to a first core adapter by way of a first instance of a core interface and a second language adapter;
    a second instance of the core interface configured to handle language constructs of a type of the first and second language constructs in the language of the core application programming interface and to receive the result from the language adapter;
    a second core adapter configured to convert the result from the second instance of the core interface from the language of the core application programming interface into the second scripting language and to provide the result in the second scripting language to the second language construct to satisfy the call; and
    an import hook for the second scripting language, the import hook configured to import modules written in a different scripting language and to cache the imported modules in each of a plurality of supported languages, wherein the language adapter, the second instance of the core interface, the second core adapter, and the import hook comprise one or more of logic hardware and a non-volatile storage medium storing computer executable code.

11. The apparatus of claim 10, further comprising the core application programming interface, wherein the core application programming interface comprises the core interface and the core interface is configured to handle a type of the first language construct and the second language construct.

12. The apparatus of claim 10, further comprising the second language adapter, wherein the second language adapter is configured to convert the call from the second scripting language into a language of the core application programming interface.

13. The apparatus of claim 10, further comprising the first core adapter, wherein the first core adapter is configured to convert the call from the language of the core application programming interface into the first scripting language and to provide the call in the first scripting language to the first language construct.

14. A system for sharing language constructs among different scripting languages, the system comprising:
- a core application programming interface comprising a core interface configured to handle a type of a first language construct written in a first scripting language and of a second language construct written in a second scripting language;
- a first language adapter configured to convert a call written in the second scripting language into a call written in a language of the core application programming interface, the call being made by the second language construct to the first language construct;
- a first instance of the core interface configured to receive the call from the first language adapter;
- a first core adapter configured to convert the call from the first instance of the core interface from the language of the core application programming interface into the first scripting language and to provide the call in the first scripting language to the first language construct;
- a second language adapter configured to receive a result for the call from the first language construct and to convert the result from the first scripting language into the language of the core application programming interface;
- a second instance of the core interface configured to receive the result from the second language adapter;
- a second core adapter configured to convert the result from the second instance of the core interface from the language of the core application programming interface into the second scripting language and to provide the result in the second scripting language to the second language construct; and
- an import hook for the second scripting language, the import hook configured to import a module written in a different scripting language and to cache the imported module in each of a plurality of supported languages,
- wherein the core application programming interface, the first language adapter, the first instance of the core interface, the first core adapter, the second language adapter, the second instance of the core interface, the second core adapter, and the import hook comprise one or more of logic hardware and a non-volatile storage medium storing computer executable code.

* * * * *